United States Patent
Lee et al.

(10) Patent No.: US 11,402,604 B2
(45) Date of Patent: Aug. 2, 2022

(54) CAMERA DEVICE ACTUATOR

(71) Applicant: Samsung Electro-Mechanics Co., Ltd., Suwon-si (KR)

(72) Inventors: Hong Joo Lee, Suwon-si (KR); Jung Woo Kim, Suwon-si (KR); Suk Young Oh, Suwon-si (KR); Young Bok Yoon, Suwon-si (KR); Dong Yeon Shin, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 435 days.

(21) Appl. No.: 16/171,899

(22) Filed: Oct. 26, 2018

(65) Prior Publication Data

US 2019/0196139 A1    Jun. 27, 2019

(30) Foreign Application Priority Data

Dec. 22, 2017    (KR) .......................... 10-2017-0178411

(51) Int. Cl.
  *G02B 7/10*    (2021.01)
  *H04N 5/225*   (2006.01)
  (Continued)

(52) U.S. Cl.
  CPC ............... *G02B 7/102* (2013.01); *G02B 7/08* (2013.01); *G02B 27/646* (2013.01);
  (Continued)

(58) Field of Classification Search
  CPC . G02B 7/04; G02B 7/102; G02B 7/08; G02B 27/64; G02B 27/646; H04N 5/2253; H04N 5/2254
  See application file for complete search history.

(56) References Cited

U.S. PATENT DOCUMENTS

| 9,086,613 | B1 | 7/2015 | Baik et al. |
| 9,804,477 | B2 | 10/2017 | Bang et al. |
| 2003/0128443 | A1* | 7/2003 | Jang ..................... G11B 7/0933 359/824 |

(Continued)

FOREIGN PATENT DOCUMENTS

| CN | 203761238 U | 8/2014 |
| CN | 104914646 A | 9/2015 |

(Continued)

OTHER PUBLICATIONS

Chinese Office Action dated Oct. 29, 2020 in counterpart Chinese Patent Application No. 201811570177.X (11 pages in English, 12 pages in Chinese).

(Continued)

*Primary Examiner* — Alicia M Harrington
(74) *Attorney, Agent, or Firm* — NSIP Law

(57) ABSTRACT

A camera device actuator includes: a magnet disposed on a side surface of a lens carrier disposed to be movable in an optical axis direction in an internal space of a fixed housing; a member to be detected disposed on the side surface of the lens carrier, connected to the magnet, and having a width in the optical axis direction that is less than a width of the magnet in the optical axis direction; a driving coil disposed opposite to and spaced apart from the magnet, on a panel disposed on the housing; and a sensing coil including a first sensing coil and a second sensing coil disposed on the panel, spaced apart from and opposite to the member to be detected, and arranged in-line with each other in the optical axis direction.

13 Claims, 4 Drawing Sheets

(51) Int. Cl.
G02B 27/64 (2006.01)
G02B 7/08 (2021.01)

(52) U.S. Cl.
CPC ......... *H04N 5/2252* (2013.01); *H04N 5/2253* (2013.01); *H04N 5/2254* (2013.01)

(56) References Cited

U.S. PATENT DOCUMENTS

| | | | |
|---|---|---|---|
| 2015/0155768 A1 | 6/2015 | Hsu et al. | |
| 2015/0346453 A1* | 12/2015 | Cheong | H04N 5/2254 359/824 |
| 2016/0320584 A1* | 11/2016 | Lee | G02B 7/08 |
| 2016/0344919 A1 | 11/2016 | Cho et al. | |
| 2017/0146889 A1* | 5/2017 | Bang | G02B 7/09 |
| 2017/0212409 A1 | 7/2017 | Kim | |
| 2019/0273847 A1* | 9/2019 | Lee | H04N 5/23267 |

FOREIGN PATENT DOCUMENTS

| | | | | |
|---|---|---|---|---|
| CN | 105278072 A | | 1/2016 | |
| CN | 106170053 A | | 11/2016 | |
| CN | 106791291 A | | 5/2017 | |
| CN | 107203026 A | | 9/2017 | |
| JP | 2000-295832 A | | 10/2000 | |
| JP | 2014-191092 A | | 10/2014 | |
| KR | 20140142189 A | * | 12/2014 | ............... G02B 7/04 |
| KR | 10-1652762 B1 | | 9/2016 | |
| KR | 10-2017-0109193 A | | 9/2017 | |

OTHER PUBLICATIONS

Korean Office Action dated Apr. 1, 2022 in corresponding Korean Patent Application No. 10-2017-0178411. (5 pages in English and 4 pages in Korean).

* cited by examiner

CAMERA DEVICE ACTUATOR

CROSS-REFERENCE TO RELATED APPLICATIONS

This application claims the benefit under 35 U.S.C. § 119(a) of Korean Patent Application No. 10-2017-0178411 filed on Dec. 22, 2017 in the Korean Intellectual Property Office, the entire disclosure of which is incorporated herein by reference for all purposes.

BACKGROUND

1. Field

The following description relates to an actuator of a camera device.

2. Description of Related Art

In general, an actuator for camera autofocusing (AF) includes a moving part including a magnet and a stator including a coil.

A coil of a conventional actuator has a coil structure of a conventional winding configuration, which requires separate labor for assembly because end portions of wires are connected to each other through a pad soldering. In addition, a hall integrated circuit (IC) including a hall sensor may be used to sense a position of a mover of the actuator.

The conventional actuator structure including the hall sensor includes a moving part including a two-pole magnet and a wire coil fixed on a surface of the magnet, such that the magnet is moved when a current is applied to the coil. In addition, a flexible printed circuit board (FPCB) is disposed on a back portion of the coil, and the actuator may include a soldering part that fixes the coil to the surface of the magnet and is connected to a terminal of the coil.

However, the conventional actuator structure including the hall sensor has disadvantages, in that the structure requires the hall sensor, and further requires an additional circuit due to the inclusion of the hall sensor. In order to avoid the above-mentioned disadvantages, instead of including the hall sensor, a conventional actuator having an inductance sensing structure may be used.

In the actuator structure including the conventional inductance sensing structure, the hall IC may be disposed on a first magnet or a surface of a second, separate magnet for sensing, thereby sensing the position of the first magnet.

However, the structure of a conventional actuator using separate magnets for driving and detection presents a problem in that the inclusion of separate magnets for driving and detection limits miniaturization of the actuator and a camera device including the actuator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera device actuator includes: a magnet disposed on a side surface of a lens carrier disposed to be movable in an optical axis direction in an internal space of a fixed housing; a member to be detected disposed on the side surface of the lens carrier, connected to the magnet, and having a width in the optical axis direction that is less than a width of the magnet in the optical axis direction; a driving coil disposed opposite to and spaced apart from the magnet, on a panel disposed on the housing; and a sensing coil including a first sensing coil and a second sensing coil disposed on the panel, spaced apart from and opposite to the member to be detected, and arranged in-line with each other in the optical axis direction.

The camera device may further include a yoke disposed on a second surface of the panel that is opposite to a first surface of the panel facing the magnet.

The yoke may be formed on a remaining region of the second surface of the panel excluding a region on which terminal pads for electrical connection are disposed.

An intermediate point along the width of the member to be detected may be positioned on a same plane, perpendicular to the optical axis together with intermediate points of the first sensing coil and the second sensing coil, in a non-driving state of the camera device actuator.

Lengths in a width direction of opposite sides of a non-connection portion of the magnet to which the member to be detected is not connected, centered on a connection portion of the magnet to which the member to be detected is connected, may be different from each other.

The width of the member to be detected may be less than a width of the sensing coil in the optical axis direction.

A width of the driving coil in the optical axis direction may be less than the width of the magnet.

In another general aspect, a camera device actuator includes: a fixed housing having an internal space; a lens carrier disposed to be movable in an optical axis direction in an internal space of the housing and accommodating a lens; a magnet disposed on a side surface of the lens carrier; a member to be detected disposed on the side surface of the lens carrier, connected to the magnet, and having a width in the optical axis direction that is less than a width of the magnet in the optical axis direction; a driving coil disposed spaced apart from and opposite to the magnet, on a panel disposed on the housing; and a sensing coil including a first sensing coil and a second sensing coil disposed on the panel, spaced apart from and opposite to the member to be detected, and arranged in-line with each other in the optical axis direction, wherein an intermediate point of the width of the member to be detected is positioned on a same plane, perpendicular to the optical axis together with intermediate points of the first sensing coil and the second sensing coil, in a non-driving state of the camera device actuator.

The camera device actuator may further include a yoke disposed on a second surface of the panel that is opposite to a first surface of the panel facing the magnet.

The yoke may be disposed on a remaining region of the second surface of the panel excluding a region on which terminal pads for electrical connection are disposed.

Lengths in a width direction of opposite sides of a non-connection portion of the magnet to which the member to be detected is not connected, centered on a connection portion of the magnet to which the member to be detected is connected, may be different from each other.

The width of the member to be detected may be less than a width of the sensing coil in the optical axis direction.

A width of the driving coil in the optical axis direction may be less than a width of the magnet.

The member to be detected may be positioned biased towards one edge of the magnet from an intermediate point of the magnet in a width direction of the magnet, and may be connected to the magnet.

In another general aspect, a camera device actuator includes: a magnet disposed on a lens carrier and configured to move in an optical axis direction within a fixed housing; a detectable member disposed adjacent to the magnet on the lens carrier and having a width in the optical axis direction that is less than a width of the magnet in the optical axis direction; a driving coil facing and spaced apart from the magnet, and disposed on a panel disposed on the housing; and a sensing coil facing and spaced apart from the magnet, and disposed on the panel, wherein the sensing coil includes a first sensing coil and a second sensing coil spaced apart from the first sensing coil in the optical axis direction.

The width of the detectable member may be less than a width of the sensing coil in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
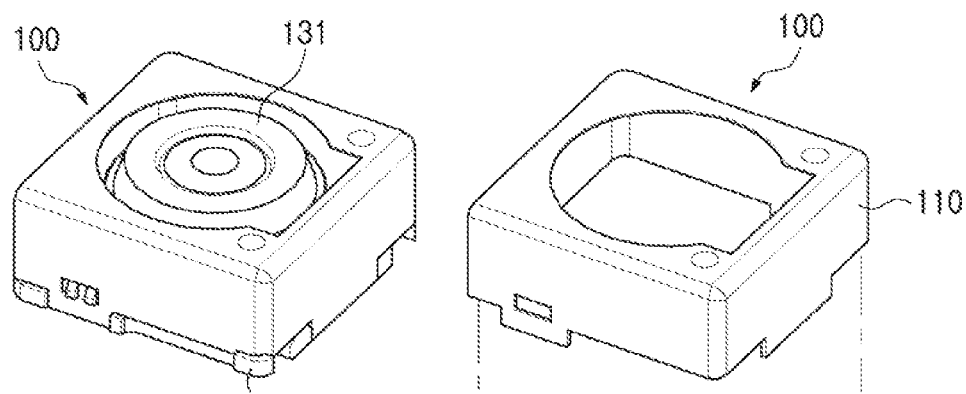
FIG. 1A is a perspective view illustrating an actuator of a camera device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1B:
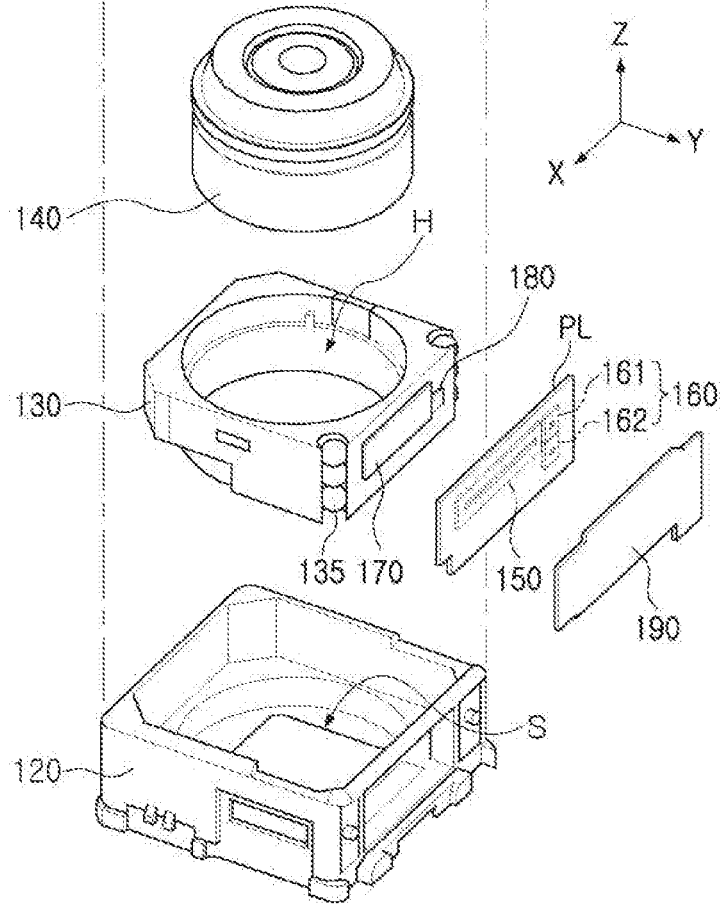
FIG. 1B is an exploded perspective view of the actuator.

FIG. 1A is a perspective view illustrating an actuator of a camera device ("camera device actuator") 100, according to an embodiment. FIG. 1B is an exploded perspective view of the camera device actuator 100.

Referring to FIGS. 1A and 1B, the camera device actuator 100 may include a housing 120, a lens carrier 130, a magnet 170, a member to be detected 180, a driving coil 150, and a sensing coil 160.

In addition, the camera device actuator 100 may further include a case 110, a panel PL, a lens barrel 140 including a plurality of lenses, and at least one ball bearing 135, as shown in FIG. 1B.

Although the camera device actuator 100 is shown to include ball bearings 135 in FIG. 1B, this disclosure is not limited to such a configuration, and may also be applied to a spring-type camera device actuator.

Referring to FIG. 1B, the lens carrier 130 may have, for example, a quadrangular shape having a cylindrical hollow H configured to accommodate the lens barrel 140 therein for capturing an image of an object. The lens barrel 140 may be provided in the lens carrier 130 along an optical axis. In this disclosure, the direction of the optical axis is a Z-axis direction in relation to the lens carrier 130 illustrated in FIGS. 1A and 1B. The lens carrier 130 may be disposed in the housing 120, and may be coupled to the housing 120 to move in the optical axis direction for the purpose of auto-focusing (AF) or move in a direction (an X-axis direction or a Y-axis direction in FIGS. 1A and 1B) perpendicular to the optical axis direction for the purpose of optical image stabilization (OIS).

Referring to FIG. 1B, the housing 120 may be installed to be fixed (e.g., disposed in a fixed position) while having an internal space S, and may accommodate the lens carrier 130 in the internal space S so that the lens carrier 130 may move in the optical axis direction or the direction perpendicular to the optical axis direction. The at least one ball bearing 135 may be provided in the lens carrier 130 along the optical axis direction, as a guide unit configured to guide a movement of the lens carrier 130 when the lens carrier 130 moves in the optical axis direction within the housing 120.

The at least one ball bearing 135 may be disposed between the lens carrier 130 and the housing 120 so that one surface of the lens carrier 130 and one surface of the housing 120 are in contact with each other, and may guide the movement of the lens carrier 130 in the optical axis direction while supporting the lens carrier 130 through a rolling motion.

As shown in FIG. 1A, the case 110 may be coupled to the housing 120 to form an appearance of the camera device actuator 100. The case 110 may be coupled to the housing 120 to surround portions of outer surfaces of the housing 120. The case 110 may include a metal or may be formed of a metal to thus be grounded to a ground pad of the panel mounted on a lower portion of the housing 120. Accordingly, the case 110 is configured to block electromagnetic waves generated during driving of the camera device actuator 100.

Referring again to FIG. 1B, the magnet 170 may be disposed on one side surface of the lens carrier 130 disposed to be movable in the optical axis direction in the internal space S of the housing 120. The magnet 170 may receive driving force by the driving coil 150 to move in the optical axis direction, and the lens carrier 130 having the magnet 170 attached thereto may thus move in the optical axis direction. As an example, the magnet 170 may be a magnet including a magnetic material having magnet property.

Still referring to FIG. 1B, the member to be detected 180 may be disposed on one side surface of the lens carrier 130 and may be connected to the magnet 170. The member to be detected 180 may have a width that is less than a width of the magnet 170 to be advantageous in miniaturizing the camera device actuator 100 and a camera device including the camera device actuator 100. Since the member to be detected 180 may be connected to the magnet 170 to supply magnetic force from the magnet 170 to the outside, the member to be detected 180 may apply electromagnetic force to the sensing coil 160. As an example, the member to be detected 180 may be formed of a magnet such as a soft magnetic substance, or a metal such as stainless steel.

As shown in FIG. 1B, the driving coil 150 may be disposed on the panel PL formed on the housing to be opposite to the magnet 170 while being spaced apart from the magnet 170 by a predetermined or specified interval. As an example, when a driving current flows in the driving coil 150, the driving coil 150 may generate the electromagnetic force to provide driving force to the magnet 170.

Still referring to FIG. 1B, the sensing coil 160 may include a first sensing coil 161 and a second sensing coil 162 which are disposed on the panel PL to be opposite to the member to be detected 180 while being space apart from the member to be detected 180 by a predetermined or specified interval, and may be arranged in-line with each other in the optical axis direction. As an example, the sensing coil 160 may detect a signal corresponding to intensity of the magnetic force formed by the member to be detected 180. Each of the first sensing coil 161 and the second sensing coil 162 may each generate the signal corresponding to the intensity of magnetic force formed by the member to be detected 180.

As described above, the sensing coil 160 may include two first and second sensing coils 161 and 162 in order to reduce vulnerability to diminished sensing performance or malfunctioning due to temperature or disturbance.

In detail, in an actuator structure including the magnet 170 and the driving coil 150, a magnetic flux density generated by the magnet may change depending on a temperature. The sensing coil 160 senses a position with a value of inductance, the inductance is in proportion to a magnetic flux density B, and when values of B in the first and second sensing coils 161 and 162 are B1(Sd1) and B2(Sd2) (see FIG. 2), respectively, factors influencing B1(Sd1) and B2(Sd2) are disturbances such as a relative position and a temperature of the magnet 170. In a case in which the magnet 170 is a conventional magnet with two poles, when the relative position of the magnet 170 is changed, B1(Sd1) and B2(Sd2) are changed to be in inverse proportion to each other, and B1(Sd1) and B2(Sd2) are together increased or decreased in the temperature or the disturbance. Therefore, when a position signal SP is calculated with (B1+B2)/(B1−B2) or (B1−B2)/(B1+B2), a calculation value is minimally changed by the disturbance such as the temperature, and only a position of the magnet 170 is changed. As a result, a position change of the magnet 170 may be accurately sensed even when the disturbance occurs.

In addition, sensing performance of the camera device actuator 100 is improved, and the sensing structure of the camera device actuator 100 may be slimmer than a conventional inductance sensing structure.

In each embodiment disclosed herein, the driving coil 150 and the sensing coil 160 may be PCB integrated type coils rather than a conventional winding type coil.

In the respective drawings in the present disclosure, an unnecessary overlapping description for components denoted by the same reference numerals and having the same functions will be omitted, and contents different from each other will be described in the respective drawings.

In addition, this disclosure may be applied to an optical image stabilizer (OIS) or a zoom driver IC using a voice coil motor (VCM).

Figure 2:
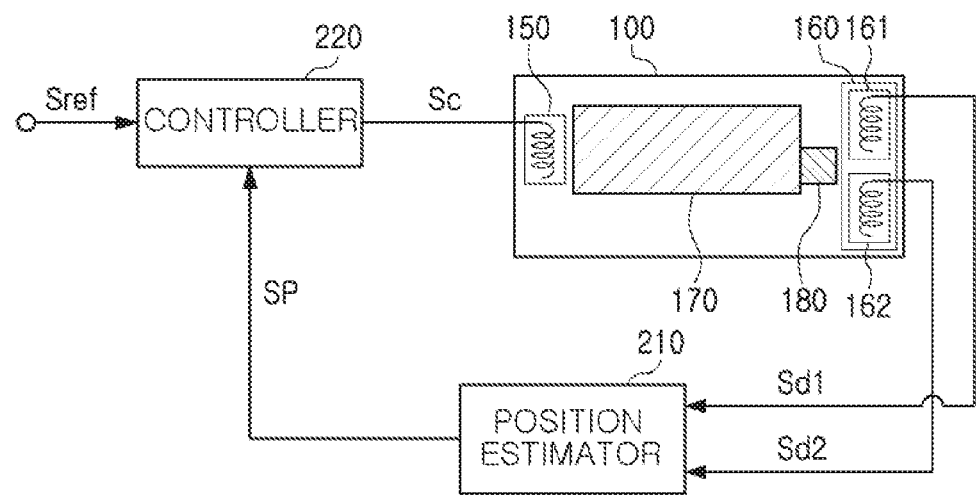
FIG. 2 is a view illustrating a control device of a camera device, according to an embodiment.

FIG. 2 is a view illustrating a configuration of a control device of a camera device, according to an embodiment.

Referring to FIG. 2, a control device of a camera device may include a position estimator 210 and a controller 220.

The controller 220 may provide a driving control signal Sc to the driving coil 150 of the actuator 100 based on a reference signal Sref corresponding to a target position and a position signal input from the position estimator 210.

In this case, the positions of the magnet 170 and the member to be detected 180 may be moved based on the driving force of the driving coil 150, and the first sensing coil 161 and the second sensing coil 162 may provide first and second detection signals Sd1 and Sd2, respectively, based on a size of an overlapping area of mutual magnetic force between the member to be detected 180 and each of the first sensing coil 161 and the second sensing coil 162.

Thereafter, the position estimator 210 may provide a position signal SP estimated based on the first and second detection signals Sd1 and Sd2 from the first sensing coil 161 and the second sensing coil 162, respectively, to the controller 220.

Figure 3A:
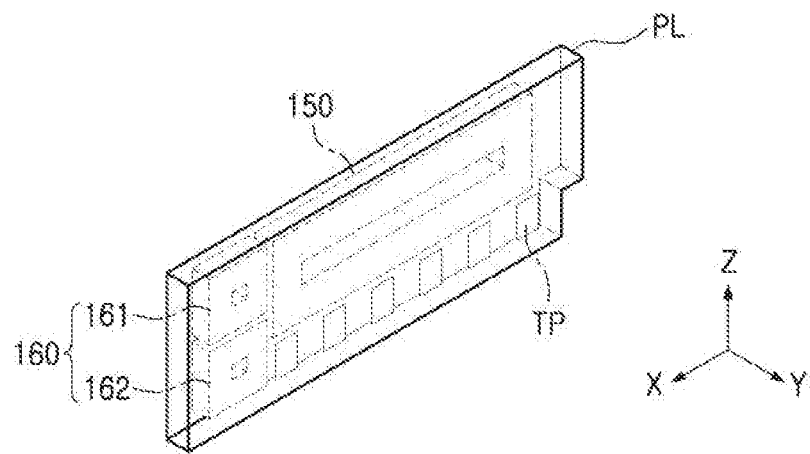
FIGS. 3A through 3C are views illustrating structures of a driving coil and a sensing coil, according to an embodiment.
Figure 3B:
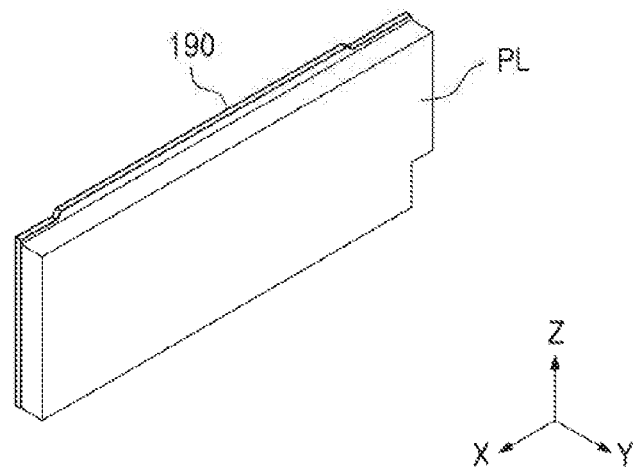
Figure 3C:
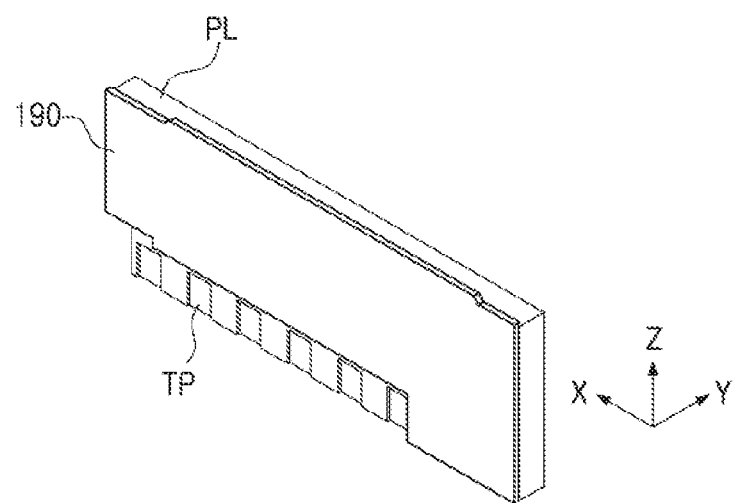

FIGS. 3A through 3C are views illustrating the driving coil 150 and the sensing coil 160, according to an embodiment.

FIG. 3A a perspective view illustrating the driving coil 150, the sensing coil 160, and terminal pads TP for an external electrical connection which are embedded in the panel PL. FIG. 3B is a view illustrating a structure of the panel PL and a yoke 190. FIG. 3C is a view illustrating the yoke 190 and a layout of the terminal pads TP.

Referring to FIGS. 3A through 3C, the camera device actuator 100 may further include the yoke 190. The yoke 190 may be disposed on a second surface of the panel PL that is opposite to a first surface of the panel PL facing the magnet 170.

As an example, the yoke 190 may be formed on the remaining region of the second surface of the panel PL except for a region on which the terminal pads TP are formed, and may be formed in a shape of '¬' as illustrated in FIG. 3C. As another example, as illustrated in FIG. 3B, in order to improve driving and sensing performance, a portion of the yoke 190 corresponding to the magnet 170 in the optical axis direction may be higher than the magnet 170.

The yoke 190 may prevent leakage magnetic flux from the magnet 170, the member to be detected 180, the driving coil 150, and the sensing coil 160 to the outside, thereby improving driving and sensing performance.

In detail, the yoke 190 having, for example, the shape of '¬', as described above may be disposed on the second surface of the panel PL opposite to the first surface of the panel PL on which the sensing coil 160 is disposed, thereby improving the driving and sensing performance, and in a case in which soldering parts corresponding to the terminal pads TP are disposed on a portion in which the yoke 190 is not disposed, a sensing region may be relatively wider than a conventional structure, and this is thus more advantageous in terms of slimness and miniaturization of the camera device.

Figure 4:
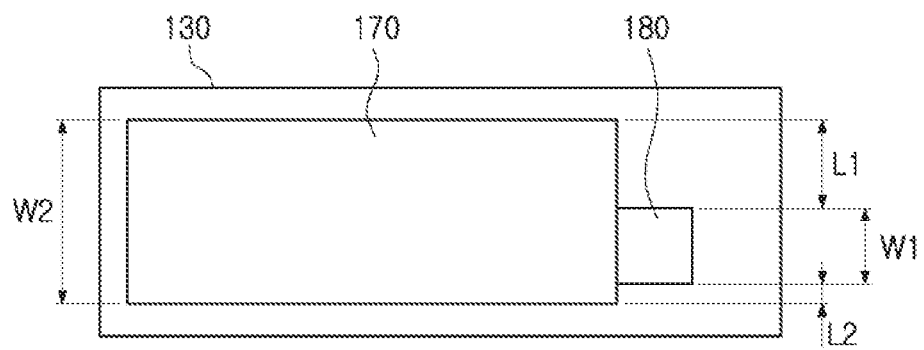
FIG. 4 is a view illustrating a magnet and a member to be detected, according to an embodiment.

FIG. 4 is a view illustrating a structure of the magnet 170 and the member to be detected 180, according to an embodiment.

Referring to FIG. 4, a width W1 of the member to be detected 180 may be less than a width W2 of the magnet 170, to provide miniaturization of the camera device.

In addition, lengths L1 and L2 in a width direction of opposite sides of a non-connection portion of the magnet 170 to which the member to be detected 180 is not connected, centered on a connection portion of the magnet 170 to which the member to be detected 180 is connected, may be different from each other.

Accordingly, the member to be detected 180 may be positioned biased towards any one edge of the magnet from an intermediate point of the magnet 170 in the width direction of the magnet 170, and may be connected to the magnet 170.

Figure 5:
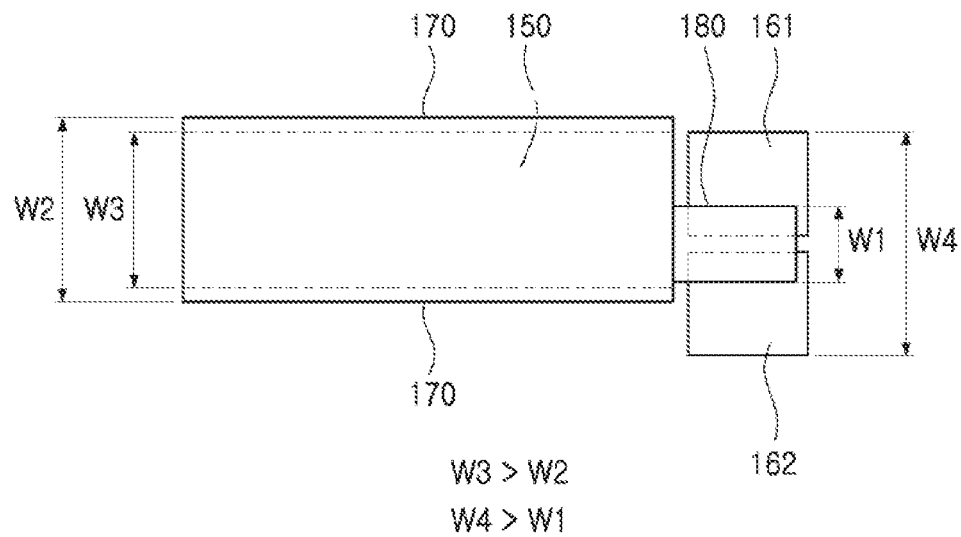
FIG. 5 is a view illustrating a relationship between a driving coil, a sensing coil, a magnet, and a member to be detected, according to an embodiment.

FIG. 5 is a view illustrating a relationship between the driving coil 150, the sensing coil 160, the magnet 170, and the member to be detected 180, according to an embodiment.

Referring to FIG. 5, an intermediate point of a width of the member to be detected 180 may be positioned on a same plane, perpendicular to the optical axis together with intermediate points of the first sensing coil 161 and the second sensing coil 162, in a non-driving state (e.g., when the camera device actuator 100 is not being driven).

In addition, the width W1 of the member to be detected 180 may be less than a length W4 of the sensing coil 160 in the optical axis direction, and a width W3 of the driving coil 150 in the optical axis direction may be less than the width W2 of the magnet 170.

As an example, a height of the sensing coil 160 in an optical axis direction may be less than that of the magnet 170, thereby improving sensing performance in an AF direction.

As set forth above, according to the embodiments disclosed herein, a camera device actuator may be advantageously miniaturized and may have improved sensing performance in comparison to conventional camera device actuators. Further, by replacing a conventional winding coil with a PCB coil, it is easy to mass-produce the camera device actuator, and the soldering process of coil terminal pads may be also easy to automate. Thus, the camera device actuator disclosed herein may be advantageous in price compared to conventional camera device actuators.

The controller 220 and the position estimator 210 in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera device actuator, comprising:
   a magnet disposed on a side surface of a lens carrier disposed to be movable in an optical axis direction in an internal space of a fixed housing;
   a position detection member disposed on the side surface of the lens carrier, connected to the magnet, and having a width in the optical axis direction that is less than a width of the magnet in the optical axis direction;
   a driving coil disposed opposite to and spaced apart from the magnet, on a panel disposed on the housing; and
   a sensing coil comprising a first sensing coil and a second sensing coil disposed on the panel, spaced apart from and opposite to the position detection member, and arranged in-line with each other in the optical axis direction,
   wherein the magnet comprises a side surface having a connection portion connected to the position detection member, and non-connection portions not connected to the position detection member and disposed on opposite sides of the position detection member in the optical axis direction, and
   wherein respective widths of the non-connection portions in the optical axis direction are different from each other.

2. The camera device actuator of claim 1, further comprising a yoke disposed on a second surface of the panel that is opposite to a first surface of the panel facing the magnet.

3. The camera device actuator of claim 2, wherein the yoke is formed on a remaining region of the second surface of the panel excluding a region on which terminal pads for electrical connection are disposed.

4. The camera device actuator of claim 1, wherein an intermediate point on the position detection member, along the width of the position detection member, is positioned on a same plane perpendicular to the optical axis together with intermediate points of the first sensing coil and the second sensing coil, when the camera device actuator is in a non-driving state.

5. The camera device actuator of claim 1, wherein the width of the position detection member is less than a width of the sensing coil in the optical axis direction.

6. The camera device actuator of claim 1, wherein a width of the driving coil in the optical axis direction is less than the width of the magnet.

7. A camera device actuator, comprising:
a fixed housing having an internal space;
a lens carrier disposed to be movable in an optical axis direction in an internal space of the housing and accommodating a lens;
a magnet disposed on a side surface of the lens carrier;
a position detection member disposed on the side surface of the lens carrier, connected to the magnet, and having a width in the optical axis direction that is less than a width of the magnet in the optical axis direction;
a driving coil disposed spaced apart from and opposite to the magnet, on a panel disposed on the housing; and
a sensing coil comprising a first sensing coil and a second sensing coil disposed on the panel, spaced apart from and opposite to the position detection member, and arranged in-line with each other in the optical axis direction,
wherein an intermediate point on the position detection member, along the width of the position detection member, is positioned on a same plane perpendicular to the optical axis together with intermediate points of the first sensing coil and the second sensing coil, when the camera device actuator is in a non-driving state, and
wherein the magnet comprises a side surface having a connection portion connected to the position detection member, and non-connection portions not connected to the position detection member and disposed on opposite sides of the position detection member in the optical axis direction, and
wherein respective widths of the non-connection portions in the optical axis direction are different from each other.

8. The camera device actuator of claim 7, further comprising a yoke disposed on a second surface of the panel that is opposite to a first surface of the panel facing the magnet.

9. The camera device actuator of claim 8, wherein the yoke is disposed on a remaining region of the second surface of the panel excluding a region on which terminal pads for electrical connection are disposed.

10. The camera device actuator of claim 7, wherein the width of the position detection member is less than a width of the sensing coil in the optical axis direction.

11. The camera device actuator of claim 7, wherein a width of the driving coil in the optical axis direction is less than a width of the magnet.

12. A camera device actuator, comprising:
a magnet disposed on a lens carrier and configured to move in an optical axis direction within a fixed housing;
a position detection member disposed adjacent to the magnet on the lens carrier and having a width in the optical axis direction that is less than a width of the magnet in the optical axis direction;
a driving coil facing and spaced apart from the magnet, and disposed on a panel disposed on the housing; and
a sensing coil facing and spaced apart from the magnet, and disposed on the panel, wherein the sensing coil comprises a first sensing coil and a second sensing coil spaced apart from the first sensing coil in the optical axis direction,
wherein the position detection member is disposed adjacent to a side surface of the magnet extending in the optical axis direction, and
wherein the side surface of the magnet includes a connection portion connected to the position detection member, and non-connection portions not connected to the position detection member and disposed on opposite sides of the position detection member in the optical axis direction, and
wherein respective widths of the non-connection portions in the optical axis direction are different from each other.

13. The camera device actuator of claim 12, wherein the width of the position detection member is less than a width of the sensing coil in the optical axis direction.

* * * * *